(12) United States Patent
Rofougaran

(10) Patent No.: US 8,036,308 B2
(45) Date of Patent: Oct. 11, 2011

(54) METHOD AND SYSTEM FOR A WIDEBAND POLAR TRANSMITTER

(75) Inventor: Ahmadreza Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 1065 days.

(21) Appl. No.: 11/680,165

(22) Filed: Feb. 28, 2007

(65) Prior Publication Data

US 2008/0205549 A1 Aug. 28, 2008

(51) Int. Cl.
*H03C 1/52* (2006.01)
*H04L 27/04* (2006.01)

(52) U.S. Cl. ......... 375/300; 332/117; 332/149; 455/130

(58) Field of Classification Search .................. 375/300, 375/299; 370/201; 330/149
See application file for complete search history.

(56) References Cited

U.S. PATENT DOCUMENTS

| | | | | |
|---|---|---|---|---|
| 5,016,259 A * | 5/1991 | Hershberger | ................. | 375/296 |
| 6,163,259 A * | 12/2000 | Barsumian et al. | ......... | 340/572.2 |
| 6,344,871 B1 * | 2/2002 | Liu et al. | .......................... | 348/21 |
| 6,359,506 B1 * | 3/2002 | Camp et al. | ............... | 330/124 R |
| 6,483,388 B2 * | 11/2002 | Khan | ............................. | 331/18 |
| 6,564,039 B1 * | 5/2003 | Meador et al. | ................. | 455/76 |
| 6,747,987 B1 * | 6/2004 | Meador et al. | ................. | 370/465 |
| 6,794,937 B1 * | 9/2004 | Timaru et al. | ................. | 330/149 |
| 6,924,711 B2 * | 8/2005 | Liu | ............................... | 332/159 |
| 7,103,113 B2 * | 9/2006 | Darabi | ......................... | 375/303 |
| 7,103,327 B2 * | 9/2006 | Pan | ............................... | 455/102 |
| 7,123,664 B2 * | 10/2006 | Matero | ......................... | 375/295 |
| 7,130,287 B2 * | 10/2006 | Nounin et al. | ................ | 370/332 |
| 7,161,613 B2 * | 1/2007 | Liu et al. | .......................... | 348/21 |
| 7,224,302 B2 * | 5/2007 | Dornbusch | .................... | 341/143 |
| 7,236,542 B2 * | 6/2007 | Matero | ......................... | 375/295 |
| 7,260,369 B2 * | 8/2007 | Feher | ............................. | 455/133 |
| 7,280,810 B2 * | 10/2007 | Feher | ............................. | 455/137 |
| 7,324,789 B2 * | 1/2008 | Jensen | ............................ | 455/76 |
| 7,343,144 B2 * | 3/2008 | Chien | ............................ | 455/255 |
| 7,358,885 B2 * | 4/2008 | Maxim et al. | ................. | 341/144 |
| 7,363,014 B2 * | 4/2008 | Nakamura et al. | .......... | 455/127.3 |
| 7,421,037 B2 * | 9/2008 | Shakeshaft et al. | ........... | 375/295 |
| 7,424,064 B2 * | 9/2008 | Shakeshaft et al. | ........... | 375/295 |
| 7,425,995 B2 * | 9/2008 | Johnson | ......................... | 348/725 |
| 7,447,493 B2 * | 11/2008 | Johnson | ......................... | 455/334 |
| 7,466,195 B2 * | 12/2008 | Drogi et al. | ................... | 330/136 |
| 7,499,680 B2 * | 3/2009 | Shi et al. | ........................ | 455/118 |
| 7,515,652 B2 * | 4/2009 | Jensen | ............................ | 375/308 |
| 7,532,908 B2 * | 5/2009 | Rofougaran et al. | ......... | 455/552.1 |

(Continued)

OTHER PUBLICATIONS

European Search Report corresponding to European Application No. 08001355.0-2206, dated May 26, 2008, 4 pages.

*Primary Examiner* — Chieh M Fan
*Assistant Examiner* — Santiago Garcia
(74) *Attorney, Agent, or Firm* — McAndrews, Held & Malloy, Ltd.

(57) ABSTRACT

Certain aspects of a method and system for a wideband polar transmitter may be disclosed. Aspects of the method may include polar modulating a plurality of signals by generating a plurality of modulated intermediate frequency (IF) signals corresponding to each of a plurality of wireless communication protocols within a transmitter that handles the plurality of wireless communication protocols. The generated plurality of modulated IF signals may be upconverted to a plurality of radio frequency (RF) signals. The plurality of RF signals may be combined and the combined plurality of RF signals may be amplitude modulated.

33 Claims, 5 Drawing Sheets

U.S. PATENT DOCUMENTS

| | | | |
|---|---|---|---|
| 7,548,742 B2 * | 6/2009 | Johnson | 455/313 |
| 7,555,271 B2 * | 6/2009 | Peng | 455/118 |
| 7,558,546 B2 * | 7/2009 | Johnson et al. | 455/182.3 |
| 7,564,302 B2 * | 7/2009 | Zolfaghari | 330/51 |
| 7,580,964 B2 * | 8/2009 | Merlo et al. | 708/276 |
| 7,593,481 B2 * | 9/2009 | Feher | 375/299 |
| 7,593,698 B1 * | 9/2009 | Johnson et al. | 455/102 |
| 7,599,418 B2 * | 10/2009 | Ahmed | 375/135 |
| 7,599,676 B2 * | 10/2009 | Maxim | 455/258 |
| 2003/0227342 A1 * | 12/2003 | Liu | 332/145 |
| 2004/0185781 A1 * | 9/2004 | Moloudi | 455/63.1 |
| 2004/0198429 A1 * | 10/2004 | Yen et al. | 455/556.1 |
| 2004/0224644 A1 * | 11/2004 | Wu et al. | 455/88 |
| 2005/0090208 A1 * | 4/2005 | Liao | 455/112 |
| 2005/0114023 A1 * | 5/2005 | Williamson et al. | 701/214 |
| 2005/0266818 A1 * | 12/2005 | Johnson et al. | 455/260 |
| 2006/0025099 A1 * | 2/2006 | Jung et al. | 455/313 |
| 2006/0074558 A1 * | 4/2006 | Williamson et al. | 701/213 |
| 2006/0209986 A1 * | 9/2006 | Jensen et al. | 375/302 |
| 2007/0002722 A1 * | 1/2007 | Palaskas et al. | 370/201 |
| 2007/0015472 A1 * | 1/2007 | Murtojarvi et al. | 455/102 |
| 2007/0019757 A1 * | 1/2007 | Matero | 375/297 |
| 2007/0027943 A1 * | 2/2007 | Jensen et al. | 708/300 |
| 2007/0032246 A1 * | 2/2007 | Feher | 455/456.1 |
| 2007/0032250 A1 * | 2/2007 | Feher | 455/456.2 |
| 2007/0076783 A1 * | 4/2007 | Dishman et al. | 375/136 |
| 2007/0165754 A1 * | 7/2007 | Kiukkonen et al. | 375/346 |
| 2007/0174371 A1 * | 7/2007 | Merlo et al. | 708/200 |
| 2007/0205865 A1 * | 9/2007 | Rofougaran et al. | 340/10.1 |
| 2007/0290749 A1 * | 12/2007 | Woo et al. | 330/149 |
| 2008/0057886 A1 * | 3/2008 | Feher | 455/151.1 |
| 2008/0123777 A1 * | 5/2008 | Trager et al. | 375/316 |
| 2008/0130800 A1 * | 6/2008 | Maxim et al. | 375/345 |
| 2008/0132189 A1 * | 6/2008 | Maxim et al. | 455/280 |
| 2008/0137566 A1 * | 6/2008 | Marholev et al. | 370/310 |
| 2008/0139118 A1 * | 6/2008 | Sanguinetti | 455/41.2 |
| 2008/0143594 A1 * | 6/2008 | Wang et al. | 342/357.12 |
| 2008/0180579 A1 * | 7/2008 | Maxim | 348/735 |
| 2008/0181337 A1 * | 7/2008 | Maxim | 375/340 |
| 2008/0181340 A1 * | 7/2008 | Maxim | 375/346 |
| 2008/0205541 A1 * | 8/2008 | Rofougaran | 375/269 |
| 2008/0205542 A1 * | 8/2008 | Rofougaran | 375/271 |
| 2008/0205543 A1 * | 8/2008 | Rofougaran | 375/271 |
| 2008/0205545 A1 * | 8/2008 | Rofougaran | 375/295 |
| 2008/0205549 A1 * | 8/2008 | Rofougaran | 375/299 |
| 2008/0205550 A1 * | 8/2008 | Rofougaran | 375/302 |
| 2008/0207139 A1 * | 8/2008 | Rofougaran | 455/91 |
| 2008/0212658 A1 * | 9/2008 | Rofougaran | 375/219 |
| 2008/0231357 A1 * | 9/2008 | Zolfaghari | 330/51 |
| 2008/0233864 A1 * | 9/2008 | Rofougaran et al. | 455/11.1 |
| 2008/0233871 A1 * | 9/2008 | Rofougaran et al. | 455/41.2 |
| 2008/0233873 A1 * | 9/2008 | Rofougaran et al. | 455/41.2 |
| 2008/0233890 A1 * | 9/2008 | Baker | 455/73 |
| 2008/0233891 A1 * | 9/2008 | Rofougaran et al. | 455/76 |
| 2008/0253353 A1 * | 10/2008 | Feher | 370/347 |
| 2009/0021321 A1 * | 1/2009 | Manku et al. | 332/151 |
| 2009/0067541 A1 * | 3/2009 | Byun et al. | 375/297 |
| 2009/0080541 A1 * | 3/2009 | Rofougaran | 375/259 |
| 2009/0081985 A1 * | 3/2009 | Rofougaran et al. | 455/326 |
| 2009/0086796 A1 * | 4/2009 | Rofougaran | 375/219 |
| 2009/0134918 A1 * | 5/2009 | Tzeng | 327/106 |
| 2009/0207025 A1 * | 8/2009 | Rofougaran et al. | 340/572.1 |
| 2009/0251210 A1 * | 10/2009 | Zolfaghari | 330/51 |

\* cited by examiner

METHOD AND SYSTEM FOR A WIDEBAND POLAR TRANSMITTER

CROSS-REFERENCE TO RELATED APPLICATIONS/INCORPORATION BY REFERENCE

This application makes reference to:
U.S. application Ser. No. 11/680,044 filed on Feb. 28, 2007;
U.S. application Ser. No. 11/680,236 filed on Feb. 28, 2007;
U.S. application Ser. No. 11/680,176 filed on Feb. 28, 2007;
U.S. application Ser. No. 11/680,188 filed on Feb. 28, 2007;
U.S. application Ser. No. 11/680,253 filed on Feb. 28, 2007; and
U.S. application Ser. No. 11/680,370 filed on Feb. 28, 2007.

Each of the above stated applications is hereby incorporated by reference in its entirety.

FIELD OF THE INVENTION

Certain embodiments of the invention relate to multi-standard systems. More specifically, certain embodiments of the invention relate to a method and system, for a wideband polar transmitter.

BACKGROUND OF THE INVENTION

A direct digital frequency synthesizer (DDFS) is a digitally-controlled signal generator that may vary the output signal frequency over a large range of frequencies, based on a single fixed-frequency precision reference clock. In addition, a DDFS is also phase-tunable. In essence, within the DDFS, discrete amplitude levels are input to a digital-to-analog converter (DAC) at a sampling rate determined by the fixed-frequency reference clock. The output of the DDFS may provide a signal whose shape may depend on the sequence of discrete amplitude levels that are input to the. DAC at the constant sampling rate. The DDFS is particularly well suited as a frequency generator that outputs a sine or other periodic waveforms over a large range of frequencies, from almost DC to approximately half the fixed-frequency reference clock frequency.

A DDFS offers a larger range of operating frequencies and requires no feedback loop, thereby providing near instantaneous phase and frequency changes, avoiding overshooting, undershooting and settling time issues associated with other analog systems. A DDFS may provide precise digitally-controlled frequency and/or phase changes without signal discontinuities.

Polar modulation is related to inphase (I) and quadrature (Q) modulation similar to polar coordinates in the Cartesian coordinate system. For polar modulation, the orthogonal I and Q components of a RF signal may be converted to a phasor representation comprising an amplitude component and a phase component. The combined I and Q signal components may be generated with one phase change and one amplitude change, for example, whereas separate I and Q modulation may require amplitude and phase modulation for each channel, especially for non-constant envelope modulation modes. In addition, the I and Q modulation approach may require good linearity of the power amplifier, often leading to power inefficient designs that suffer from parameter variability due to factors such as temperature. In contrast, polar modulation may allow the use of very efficient and non-linear amplifier designs for non-constant envelope modulation schemes.

Both Bluetooth and WLAN radio devices, such as those used in, for example, handheld wireless terminals, generally operate in the 2.4 GHz (2.4000-2.4835 GHz) Industrial, Scientific, and Medical (ISM) unlicensed band. Other radio devices, such as those used in cordless phones, may also operate in the ISM unlicensed band. While the ISM band provides a suitable low-cost solution for many of short-range wireless applications, it may also have some drawbacks when multiple users operate simultaneously. For example, because of the limited bandwidth, spectrum sharing may be necessary to accommodate multiple users and/or multiple different types of communication protocols. Multiple active users may also result in significant interference between operating devices. Moreover, in some instances, other devices such as microwave ovens may also operate in this frequency spectrum and may produce significant interference or blocking signals that may affect Bluetooth and/or WLAN transmissions.

Oscillators may be utilized in wireless receivers and transmitters to provide frequency conversion, and to provide sinusoidal sources for modulation. The oscillators may operate over frequencies ranging from several kilohertz to many gigahertz, and may be tunable over a set frequency range. A typical oscillator may utilize a transistor with a LC network to control the frequency of oscillation. The frequency of oscillation may be tuned by adjusting the values of the LC resonator. A crystal controlled oscillator (XCO) may be enabled to provide an accurate output frequency, if the crystal is in a temperature controlled environment. A phase locked loop (PLL) may utilize a feedback control circuit and an accurate reference source such as a crystal controlled oscillator to provide an output that may be tunable with a high accuracy. Phase locked loops and other circuits that provide accurate and tunable frequency outputs may be referred to as frequency synthesizers.

Phase noise is a measure of the sharpness of the frequency domain spectrum of an oscillator, and may be critical for many modern wireless systems as it may severely degrade the performance of a wireless system. The phase noise may add to the noise level of the receiver, and a noisy local oscillator may lead to down conversion of undesired nearby signals. This may limit the selectivity of the receiver and the proximity of spacing adjacent channels in a wireless communication system.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for a wideband polar transmitter, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a wideband polar transmitter. Aspects of the method and system may comprise polar modulating a plurality of signals by generating a plurality of modulated intermediate frequency (IF) signals corresponding to each of a plurality of wireless communication protocols within a transmitter that handles the plurality of wireless communication protocols. The generated plurality of modulated IF signals may be upconverted to a plurality of radio frequency (RF) signals. The upconverted plurality of RF signals may be combined and the combined plurality of RF signals may be amplitude modulated.

Figure 1A:
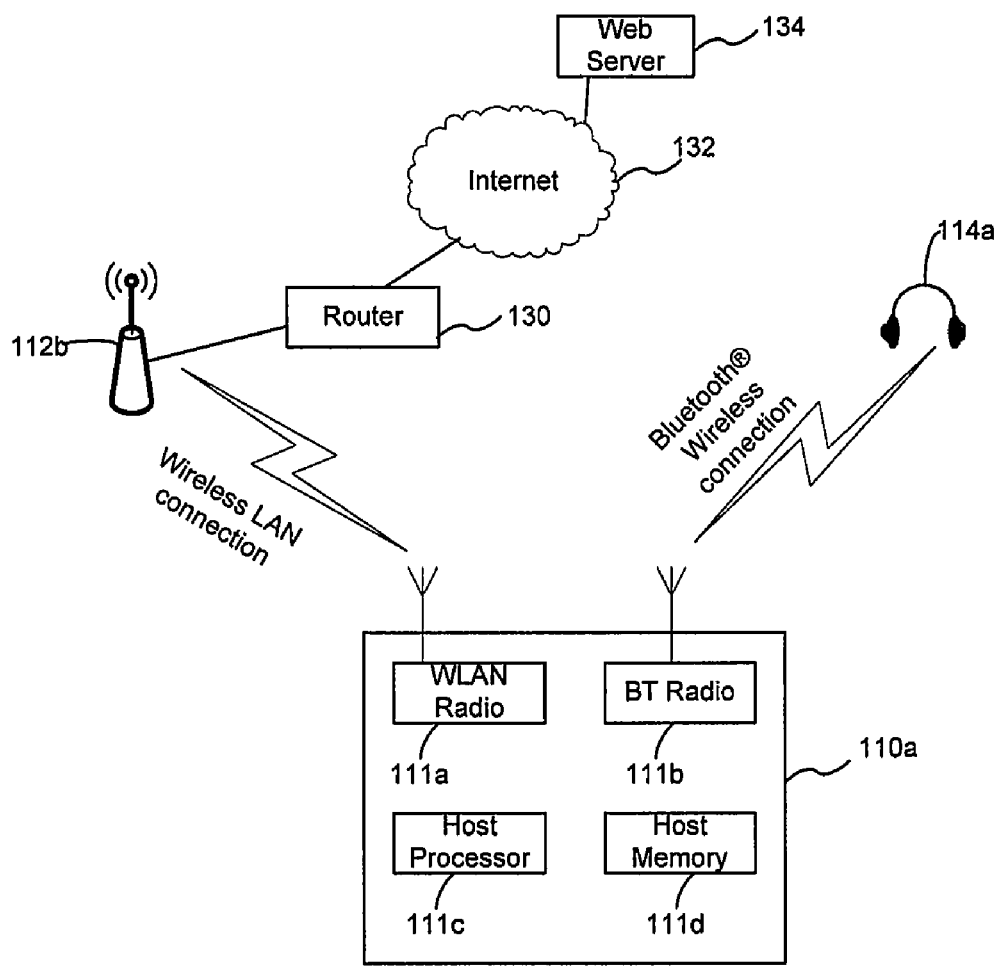
FIG. 1A is a diagram illustrating an exemplary wireless local area network (WLAN) and Bluetooth wireless communication system that may be utilized in connection with an embodiment of the invention.

FIG. 1A is a diagram illustrating an exemplary wireless local area network (WLAN) and Bluetooth wireless communication system that may be utilized in connection with an embodiment of the invention. Referring to FIG. 1A, there is shown a WLAN access point 112b, a computer 110a, a Bluetooth headset 114a, a router 130, the Internet 132 and a web server 134. The computer or host device 110a may comprise a wireless local area network (WLAN) radio 111a, a Bluetooth radio 111b, a host processor 111c, and a host memory 111d. There is also shown a Wireless LAN (WLAN) connection between the wireless LAN radio 111a and the wireless LAN access point 112b, and a Bluetooth wireless connection between the Bluetooth® radio 111b and the Bluetooth headset 114a.

The WLAN radio 111a may be compliant with IEEE 802.11 standard. There may be instances when the WLAN radio 111a and the Bluetooth radio 111b are active concurrently. Notwithstanding, the computer 110a may comprise a ZigBee radio portion that may be capable of handling ZigBee wireless communication protocols. A user may establish a WLAN connection between the computer 110a and the access point 112b in order to access the Internet 132. The streaming content from the Web server 134 may be received by the computer or host device 110a via the router 130, the access point 112b, and the WLAN connection. The user of the computer 110a may be enabled to listen to an audio portion of the streaming content on the Bluetooth headset 114a by establishing a Bluetooth wireless connection with the Bluetooth headset 114a.

Figure 1B:
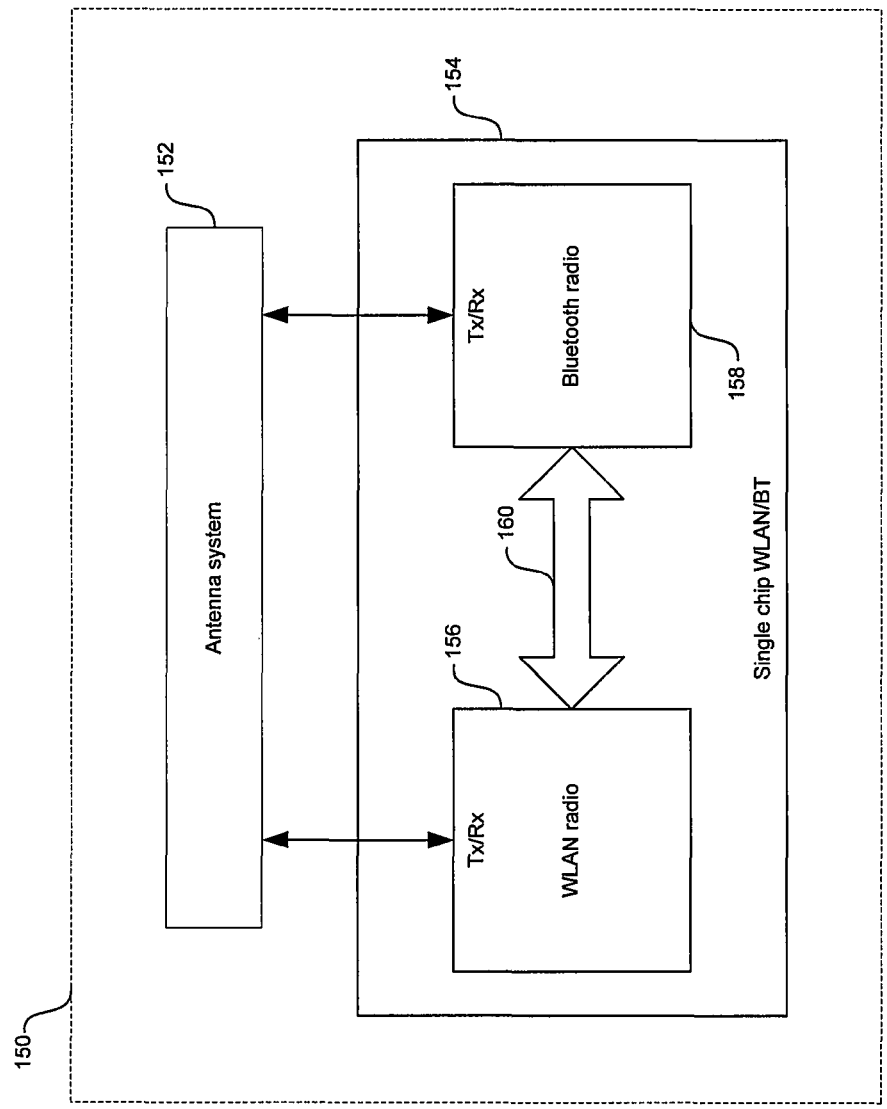
FIG. 1B is a block diagram that illustrates an exemplary single integrated circuit (IC) that supports WLAN and Bluetooth radio operations, in accordance with an embodiment of the invention.

FIG. 1B is a block diagram that illustrates an exemplary single radio chip that supports WLAN and Bluetooth radio operations, in accordance with an embodiment of the invention. Referring to FIG. 1B, there is shown a mobile phone 150 that may comprise a WLAN/Bluetooth coexistence antenna system 152 and a single chip WLAN/Bluetooth (WLAN/BT) radio device 154. The single chip WLAN/BT radio device 154 may comprise a WLAN radio portion 156 and a Bluetooth radio portion 158. The single chip WLAN/BT radio device 154 may be implemented based on a system-on-chip (SOC) architecture, for example.

The WLAN/Bluetooth coexistence antenna system 152 may comprise suitable hardware, logic, and/or circuitry that may be enabled to provide WLAN and Bluetooth communication between external devices and a coexistence terminal. The WLAN/Bluetooth coexistence antenna system 152 may comprise at least one antenna for the transmission and reception of WLAN and Bluetooth packet traffic.

The WLAN radio portion 156 may comprise suitable logic, circuitry, and/or code that may be enabled to process WLAN protocol packets for communication. The WLAN radio portion 156 may be enabled to transfer and/or receive WLAN protocol packets and/or information to the WLAN/Bluetooth coexistence antenna system 152 via a single transmit/receive (Tx/Rx) port. In some instances, the transmit port (Tx) may be implemented separately from the receive port (Rx). The WLAN radio portion 156 may also be enabled to generate signals that control at least a portion of the operation of the WLAN/Bluetooth coexistence antenna system 152. Firmware operating in the WLAN radio portion 156 may be utilized to schedule and/or control WLAN packet communication, for example.

The WLAN radio portion 156 may also be enabled to receive and/or transmit priority signals 160. The priority signals 160 may be utilized to schedule and/or control the collaborative operation of the WLAN radio portion 156 and the Bluetooth radio portion 158. The Bluetooth radio portion 158 may comprise suitable logic, circuitry, and/or code that may be enabled to process Bluetooth protocol packets for communication. The Bluetooth radio portion 158 may be enabled to transfer and/or receive Bluetooth protocol packets and/or information to the WLAN/Bluetooth coexistence antenna system 152 via a single transmit/receive (Tx/Rx) port. In some instances, the transmit port (Tx) may be implemented separately from the receive port (Rx). The Bluetooth radio portion 158 may also be enabled to generate signals that control at least a portion of the operation of the WLAN/Bluetooth coexistence antenna system 152. Firmware operating in the Bluetooth radio portion 158 may be utilized to schedule and/or control Bluetooth packet communication. The Bluetooth radio portion 158 may also be enabled to receive and/or transmit priority signals 160. A portion of the operations supported by the WLAN radio portion 156 and a portion of the operations supported by the Bluetooth radio portion 158 may be performed by common logic, circuitry, and/or code.

In some instances, at least a portion of either the WLAN radio portion 156 or the Bluetooth radio portion 158 may be disabled and the wireless terminal may operate in a single-communication mode, that is, coexistence may be disabled. When at least a portion of the WLAN radio portion 156 is disabled, the WLAN/Bluetooth coexistence antenna system 152 may utilize a default configuration to support Bluetooth communication. When at least a portion of the Bluetooth radio portion 158 is disabled, the WLAN/Bluetooth coexistence antenna system 152 may utilize a default configuration to support WLAN communication. Notwithstanding, the mobile phone 150 may comprise a WLAN/ZigBee coexistence antenna system or a Bluetooth/ZigBee coexistence antenna system and a single chip WLAN/ZigBee radio device or a single chip Bluetooth/ZigBee radio device. The single chip WLAN/ZigBee radio device may comprise a WLAN radio portion and a ZigBee radio portion. Similarly, a single chip Bluetooth/ZigBee radio device may comprise a Bluetooth radio portion and a ZigBee radio portion. The single chip WLAN/ZigBee radio device or the single chip Bluetooth/ZigBee radio device may be implemented based on a system-on-chip (SOC) architecture, for example.

Figure 2:
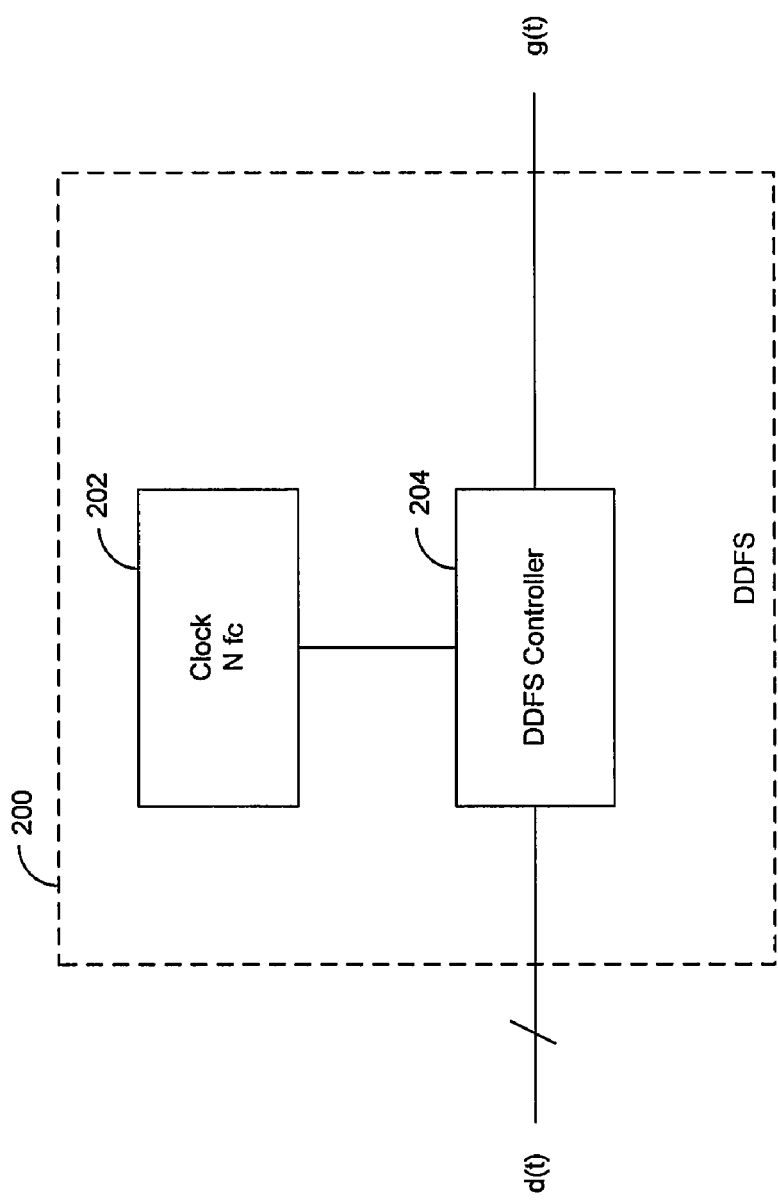
FIG. 2 is a block diagram illustrating an exemplary direct digital frequency synthesizer (DDFS), in accordance with an embodiment of the invention.

FIG. 2 is a block diagram illustrating an exemplary direct digital frequency synthesizer (DDFS), in accordance with an embodiment of the invention. Referring to FIG. 2, there is shown a DDFS 200, a clock 202 and a DDFS controller 204. The DDFS 200 may be a digitally-controlled signal generator that may vary the analog output signal g(t) over a large range of frequencies, based on a single fixed-frequency precision reference clock, for example, clock 202. Notwithstanding, the DDFS 200 may also be phase-tunable. The digital input signal d(t) may comprise control information regarding the frequency and/or phase of the analog output signal g(t) that may be generated as a function of the digital input signal d(t). The clock 202 may provide a reference clock that may be N times higher than the frequency fc of the generated output signal g(t). The DDFS controller 204 may generate a variable frequency analog output signal g(t) by utilizing the clock 202 and the digital input signal d(t).

Figure 3:
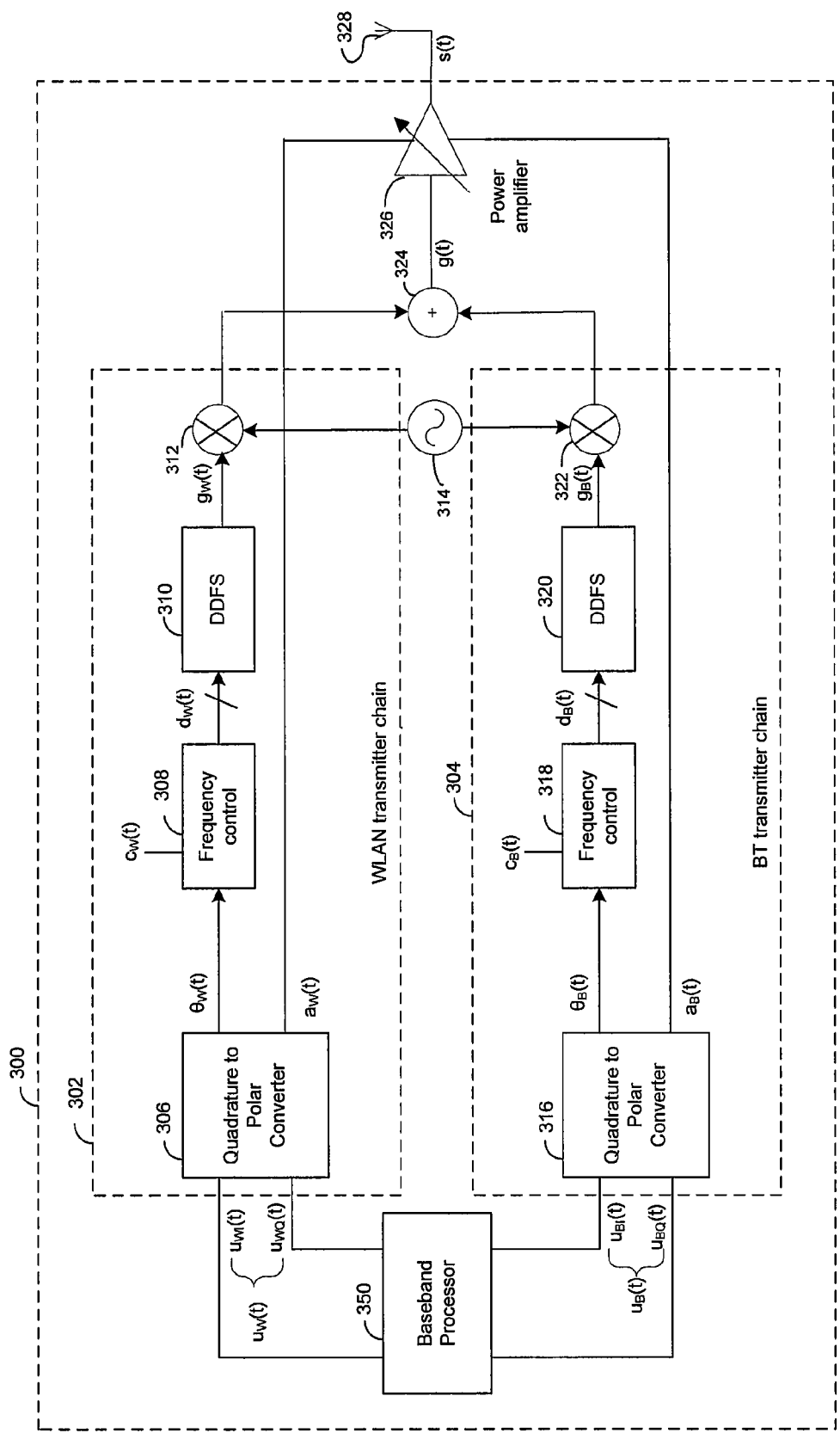
FIG. 3 is a block diagram illustrating an exemplary wideband polar transmitter, in accordance with an embodiment of the invention.

FIG. 3 is a block diagram illustrating an exemplary wideband polar transmitter, in accordance with an embodiment of the invention. Referring to FIG. 3, there is shown a wideband polar transmitter 300 and a transmission antenna 328. The wideband polar transmitter 300 may comprise a baseband processor 350, a WLAN transmitter chain 302, a Bluetooth (BT) transmitter chain 304, a summer 324, a voltage controlled oscillator (VCO) 314, and a power amplifier 326. The WLAN transmitter chain 302 may comprise a Quadrature-to-Polar (Q2P) converter 306, a frequency control block 308, a DDFS 310, and a mixer 312. There is also shown a complex envelope signal $u_W(t)=u_{WI}(t)+j\,u_{WQ}(t)$, comprising an inphase component $u_{WI}(t)$ and a quadrature component $u_{WQ}(t)$, a phase $\theta_W(t)$, an amplitude $a_W(t)$, a frequency control signal $c_W(t)$, a digital DDFS control signal $d_W(t)$, a DDFS output signal $g_W(t)$, a combined RF signal g(t) and a transmit signal s(t). The BT transmitter chain 304 may comprise a Quadrature-to-Polar (Q2P) converter 316, a frequency control block 318, a DDFS 320, and a mixer 322. There is also shown a complex envelope signal $u_B(t)=u_{BI}(t)+j\,u_{BQ}(t)$, comprising an inphase component $u_{BI}(t)$ and a quadrature component $u_{BQ}(t)$, a phase $\theta_B(t)$, an amplitude $a_B(t)$, a frequency control signal $c_B(t)$, a digital DDFS control signal $d_B(t)$, and a DDFS output signal $g_B(t)$.

The baseband processor 350 may comprise suitable logic, circuitry and/or code that may be enabled to generate baseband signals for a plurality of wireless communication protocols. In one embodiment of the invention, the baseband processor 350 may be enabled to process and modulate the quadrature component $u_{WQ}(t)$ and the inphase component $u_{WI}(t)$ of the complex envelope $u_W(t)$ separately. Polar modulation in conjunction with DDFS may be utilized for handling, for example, non-constant envelope modulation methods. Polar modulation may allow combining the inphase and quadrature components such that amplitude modulation and phase modulation for the complex envelope may be achieved by phase modulation followed by amplitude modulation or vice versa. The ability to sequentially modulate amplitude and phase may avoid a need for high quality linear power amplifiers as may be desirable in more common inphase and quadrature modulation, for example, for non-constant envelope modulation.

The Q2P converter 306 may comprise suitable logic, circuitry and/or code that may be enabled to convert the complex envelope signal $u_W(t)$, which may also be referred to as complex lowpass equivalent signal, into polar form. The Q2P converter 306 may be enabled to convert the complex envelope signal $u_W(t)$, which may also be referred to as complex lowpass equivalent signal, into polar form. The phase $\theta_W(t)$ and the amplitude $a_W(t)$ may be obtained from $u_W(t)$ according to the following equations:

$$a_W(t) = \sqrt{u_{WI}^2(t) + u_{WQ}^2(t)}$$

$$\theta_W(t) = \tan^{-1}\left(\frac{u_{WQ}(t)}{u_{WI}(t)}\right)$$

and $$u_W(t) = a_W(t)e^{j\theta_W(t)}.$$

The frequency control block 308 may be enabled to receive the phase $\theta_W(t)$ and the frequency control signal $c_W(t)$. The frequency control block 308 may be enabled to generate a digital signal $d_W(t)$ to the DDFS 310.

The Q2P converter 316 may comprise suitable logic, circuitry and/or code that may be enabled to convert the complex envelope signal $u_B(t)$, which may also be referred to as complex lowpass equivalent signal, into polar form. The Q2P converter 316 may be enabled to convert the complex envelope signal $u_B(t)$, which may also be referred to as complex lowpass equivalent signal, into polar form. The phase $\theta_B(t)$ and the amplitude $a_B(t)$ may be obtained from $u_B(t)$ according to the following equations:

$$a_B(t) = \sqrt{u_{BI}^2(t) + u_{BQ}^2(t)}$$

$$\theta_B(t) = \tan^{-1}\left(\frac{u_{BQ}(t)}{u_{BI}(t)}\right)$$

and $$u_B(t) = a_B(t)e^{j\theta_B(t)}.$$

The frequency control block 318 may be enabled to receive the phase $\theta_B(t)$ and the frequency control signal $c_B(t)$. The frequency control block 318 may be enabled to generate a digital signal $d_B(t)$ to the DDFS 320.

The DDFS 310 and DDFS 320 may comprise suitable logic, circuitry, and/or code that may be enabled to achieve near instantaneous frequency and phase shifts over a large frequency range while maintaining a phase-continuous signal. The DDFS 310 and DDFS 320 may be enabled to generate a plurality of modulated intermediate frequency (IF) signals corresponding to each of a plurality of wireless communication protocols, for example, Bluetooth, WLAN, or ZigBee within the wideband polar transmitter 300 that handles the plurality of wireless communication protocols. The DDFS 310 and DDFS 320 may be enabled to perform frequency and phase modulation. The DDFS 310 may be enabled to generate the analog output signal $g_W(t)$, where $$g_W(t)=\cos(2\pi f_{CW}(t)t+\theta_W(t))$$

where $f_{CW}(t)=c(t)f_W$ may be a time-varying carrier. The frequency $f_{CW}(t)$ may be time varying, for example, because of frequency hopping, and the frequency hopping sequence may be controlled by the frequency control signal $c_W(t)$. The frequency $f_W$ may be a constant frequency. Similarly, the DDFS 310 may be enabled to generate the analog output signal $g_B(t)$, where $$g_B(t)\cos(2\pi f_{CB}(t)t+\theta_B(t))$$

where $f_{CB}(t)=c(t)f_B$ may be a time-varying carrier. The frequency $f_{CB}(t)$ may be time varying, for example, because of frequency hopping, and the frequency hopping sequence may be controlled by the frequency control signal $c_B(t)$. The frequency $f_B$ may be a constant frequency.

The VCO 314 may comprise suitable logic, circuitry, and/or code that may be enabled to generate a reference clock signal to the plurality of mixers 312 and 322. The mixer 312 may comprise suitable logic, circuitry, and/or code, that may be enabled to upconvert the plurality of generated modulated IF signals corresponding to the WLAN communication protocol to a plurality of RF signals. The summer 324 may comprise suitable logic, circuitry, and/or code that may be enabled to combine the plurality of RF signals received from the plurality of mixers 312 and 322. The summer 324 may be enabled to generate an output signal g(t) to the power amplifier 326.

The power amplifier 326 may comprise suitable logic, circuitry, and/or code that may be enabled to amplitude modulate the received combined plurality of RF signals. The power amplifier 326 may be enabled to perform amplitude modulation. The power amplifier 326 may amplitude modulate the combined RF signal g(t) to generate the transmit signal s(t), where $$s(t)=(a_W(t)+a_B(t))g(t)$$

The signal s(t) may then be transmitted via antenna 328.

Figure 4:
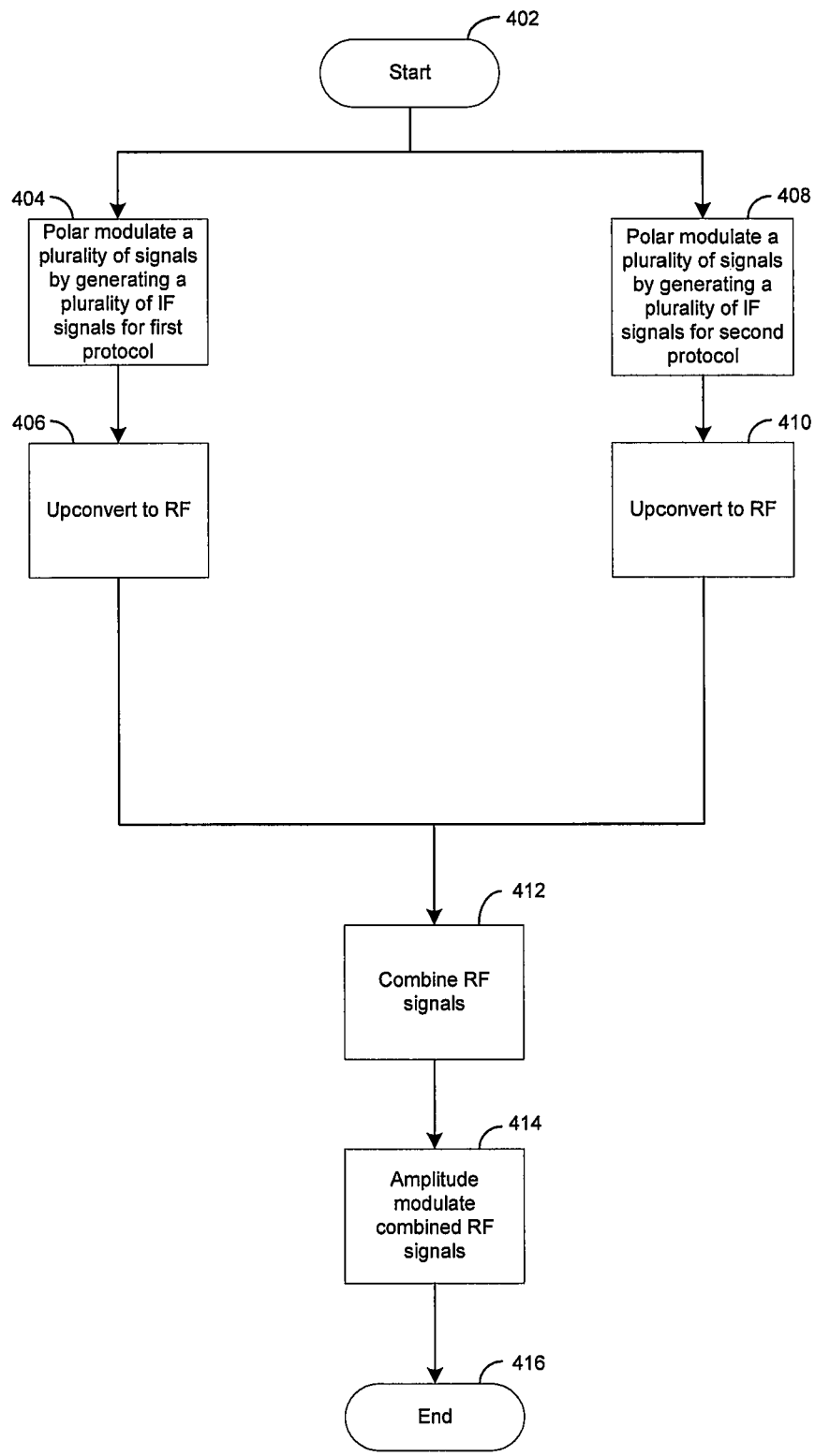
FIG. 4 is a flowchart illustrating exemplary steps, which may be utilized during operation of a wideband polar transmitter, in accordance with an embodiment of the invention.

FIG. 4 is a flowchart illustrating exemplary steps, which may be utilized during operation of a wideband polar transmitter, in accordance with an, embodiment of the invention. Referring to FIG. 4, exemplary steps may begin at step 402. In step 404, the wideband polar transmitter 300 may be enabled to polar modulate a plurality of signals by generating a plurality of modulated IF signals, for example, $g_W(t)$ corresponding to a first wireless communication protocol, for example, WLAN. In step 406, the mixer 312 may be enabled to upconvert the received IF signal, for example, $g_W(t)$ to a RF signal. In step 408, the wideband polar transmitter 300 may be enabled to polar modulate a plurality of signals by generating a plurality of modulated IF signals, for example, $g_B(t)$ corresponding to a second wireless communication protocol, for example, Bluetooth. In step 410, the mixer 322 may be enabled to upconvert the received IF signal, for example, $g_B(t)$ to a RF signal.

In step 412, the summer 324 may be enabled to combine the upconverted plurality of RF signals to generate a combined RF signal g(t). In step 414, the power amplifier 326 may be enabled to amplitude modulate the combined plurality of RF signals to generate an output signal s(t). The signal s(t) may then be transmitted via antenna 328. Control then passes to end step 416.

In accordance with an embodiment of the invention, a method and system for a wideband polar transmitter may include a wideband polar transmitter 300 that enables polar modulation of a plurality of signals by generating a plurality of modulated intermediate frequency (IF) signals, for example, $g_W(t)$, $g_B(t)$ corresponding to each of a plurality of wireless communication protocols, for example, WLAN, Bluetooth or ZigBee. The plurality of mixers 312 and 322 may be enabled to upconvert the generated plurality of modulated IF signals, for example, $g_W(t)$, $g_B(t)$ into a plurality of radio frequency (RF) signals. The summer 324 may be enabled to combine the upconverted plurality of RF signals to generate a combined RF signal g(t). The power amplifier 326 may be enabled to amplitude modulate the combined plurality of RF signals to generate an output signal s(t).

The DDFS 310 and DDFS 320 may be enabled to generate the plurality of modulated IF signals, for example, $g_W(t)$ and $g_B(t)$. The DDFS 310 and DDFS 320 may be enabled to phase modulate the generated plurality of modulated IF signals, for example, $g_W(t)$ and $g_B(t)$. The DDFS 310 and DDFS 320 may be enabled to frequency modulate the generated plurality of modulated IF signals, for example, $g_W(t)$ and $g_B(t)$. The DDFS 310 and DDFS 320 may be enabled to select a particular frequency channel corresponding to each of the plurality of wireless communication protocols, for example, selecting a particular center frequency corresponding one or more of the Bluetooth, WLAN or ZigBee communication protocols. The plurality of mixers 312 and 322 may be enabled to mix the generated plurality of modulated IF signals and accordingly generate a corresponding plurality of RF signals. The generated plurality of modulated IF signals may be amplitude modulated. In accordance with an embodiment of the invention, a method for processing communication signals may comprise polar modulating a signal using a direct digital frequency synthesizer, for example, DDFS 310 by combining an inphase component, $u_{WI}(t)$ and a quadrature component $u_{WQ}(t)$ of the signal $u_W(t)$. A complex envelope of the combined inphase component and quadrature component of the signal $u_W(t)$ may be amplitude modulated and phase modulated.

Another embodiment of the invention may provide a machine-readable storage, having stored thereon, a computer program having at least one code section executable by a machine, thereby causing the machine to perform the steps as described above for a wideband polar transmitter.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing communication signals in a transmitter that handles a plurality of different wireless communication protocols, the method comprising:

polar modulating, utilizing one or more direct digital frequency synthesizers, a plurality of signals to generate a plurality of modulated intermediate frequency (IF) signals corresponding to each of said plurality of different wireless communication protocols and to generate a plurality of amplitude signals corresponding to each of said plurality of different wireless communication protocols;

up-converting said generated plurality of modulated IF signals to a plurality of radio frequency (RF) signals;

combining said plurality of RF signals; and amplitude modulating said combined plurality of RF signals and said generated plurality of amplitude signals.

2. The method according to claim 1, wherein said plurality of wireless communication protocols comprises of: a Bluetooth communication protocol, a wireless local area network (WLAN) communication protocol and/or a ZigBee communication protocol.

3. The method according to claim 1, comprising phase modulating said generated plurality of modulated IF signals utilizing said one or more direct digital frequency synthesizers.

4. The method according to claim 1, comprising frequency modulating said generated plurality of modulated IF signals utilizing said one or more direct digital frequency synthesizers.

5. The method according to claim 1, comprising selecting a particular frequency channel corresponding to each of said plurality of wireless communication protocols.

6. The method according to claim 1, comprising amplitude modulating said generated plurality of modulated IF signals.

7. A system for processing communication signals in a transmitter that handles a plurality of different wireless communication protocols, the system comprising:

one or more circuits that are operable to polar modulate, utilizing one or more direct digital frequency synthesizers, a plurality of signals to generate a plurality of modulated intermediate frequency (IF) signals corresponding to each of said plurality of different wireless communication protocols and to generate a plurality of amplitude signals corresponding to each of said plurality of different wireless communication protocols;

said one or more circuits are operable to up-convert said generated plurality of modulated IF signals to a plurality of radio frequency (RF) signals;

said one or more circuits are operable to combine said plurality of RF signals; and said one or more circuits are operable to amplitude modulate said combined plurality of RF signals and said generated plurality of amplitude signals.

8. The system according to claim 7, wherein said plurality of different wireless communication protocols comprises of: a Bluetooth communication protocol, a wireless local area network (WLAN) communication protocol and/or a ZigBee communication protocol.

9. The system according to claim 7, wherein said one or more circuits are operable to phase modulate said generated plurality of modulated IF signals.

10. The system according to claim 7, wherein said one or more circuits are operable to frequency modulate said generated plurality of modulated IF signals.

11. The system according to claim 7, wherein said one or more circuits are operable to select a particular frequency channel corresponding to each of said plurality of wireless communication protocols.

12. The system according to claim 7, wherein said one or more circuits are operable to amplitude modulate said generated plurality of modulated IF signals.

13. A non-transitory machine-readable storage having stored thereon, a computer program having at least one code section for processing communication signals in a transmitter that handles a plurality of different wireless communication protocols, the at least one code section being executable by a machine for causing the machine to perform steps comprising:

polar modulating, utilizing one or more direct digital frequency synthesizers, a plurality of signals to generate a plurality of modulated intermediate frequency (IF) signals corresponding to each of said plurality of different wireless communication protocols and to generate a plurality of amplitude signals corresponding to each of said plurality of different wireless communication protocols;

up-converting said generated plurality of modulated IF signals to a plurality of radio frequency (RF) signals;

combining said plurality of RF signals; and amplitude modulating said combined plurality of RF signals and said generated plurality of amplitude signals.

14. The non-transitory machine-readable storage according to claim 13, wherein said plurality of different wireless communication protocols comprises of: a Bluetooth communication protocol, a wireless local area network (WLAN) communication protocol and/or a ZigBee communication protocol.

15. The non-transitory machine-readable storage according to claim 13, wherein said at least one code section comprises code for phase modulating said generated plurality of modulated IF signals.

16. The non-transitory machine-readable storage according to claim 13, wherein said at least one code section comprises code for frequency modulating said generated plurality of modulated IF signals.

17. The non-transitory machine-readable storage according to claim 13, wherein said at least one code section comprises code for selecting a particular frequency channel corresponding to each of said plurality of wireless communication protocols.

18. The non-transitory machine-readable storage according to claim 13, wherein said at least one code section comprises code for amplitude modulating said generated plurality of modulated IF signals.

19. A method for processing communication signals in a transmitter that handles a plurality of different wireless communication protocols, the method comprising:

polar modulating, utilizing one or more direct digital frequency synthesizers, a plurality of signals to generate a plurality of modulated intermediate frequency (IF) signals corresponding to each of said plurality of different wireless communication protocols and to, generate a plurality of amplitude signals corresponding to each of said plurality of different wireless communication protocols;

frequency modulating said generated plurality of modulated IF signals utilizing said one or more direct digital frequency synthesizers;

up-converting said generated plurality of modulated IF signals to a plurality of radio frequency (RF) signals; and combining said plurality of RF signals; and amplitude modulating said combined RF signals and said generated plurality of amplitude signals.

20. The method according to claim 19, wherein said different plurality of wireless communication protocols comprises of: a Bluetooth communication protocol, a wireless local area network (WLAN) communication protocol and/or a ZigBee communication protocol.

21. The method according to claim 19, comprising phase modulating said generated plurality of modulated IF signals utilizing said one or more direct digital frequency synthesizers.

22. The method according to claim 19, comprising selecting a particular frequency channel corresponding to each of said plurality of wireless communication protocols.

23. The method according to claim 19, comprising amplitude modulating said generated plurality of modulated IF signals.

24. A system for processing communication signals in a transmitter that handles a plurality of different wireless communication protocols, the system comprising:
- one or more circuits that are operable to polar modulate, utilizing one or more direct digital frequency synthesizers, a plurality of signals to generate a plurality of modulated intermediate frequency (IF) signals corresponding to each of said plurality of different wireless communication and to generate a plurality of amplitude signals corresponding to each of said plurality of different wireless communication protocols;
- said one or more circuits are operable to frequency modulate said generated plurality of modulated IF signals utilizing said one or more direct digital frequency synthesizers;
- said one or more circuits are operable to up-convert said generated plurality of modulated IF signals to a plurality of radio frequency (RF) signals; and
- combining said plurality of RF signals; and
- said one or more circuits are operable to amplitude modulate said combined RF signals and said generated plurality of amplitude signals.

25. The system according to claim 24, wherein said plurality of different wireless communication protocols comprises of: a Bluetooth communication protocol, a wireless local area network (WLAN) communication protocol and/or a ZigBee communication protocol.

26. The system according to claim 24, wherein said one or more circuits are operable to phase modulate said generated plurality of modulated IF signals utilizing said one or more direct digital frequency synthesizers.

27. The system according to claim 24, wherein said one or more circuits are operable to select a particular frequency channel corresponding to each of said plurality of wireless communication protocols.

28. The system according to claim 24, wherein said one or more circuits are operable to amplitude modulate said generated plurality of modulated IF signals.

29. A non-transitory machine-readable storage having stored thereon, a computer program having at least one code section for processing communication signals in a transmitter that handles a plurality of different wireless communication protocols, the at least one code section being executable by a machine for causing the machine to perform steps comprising:
- polar modulating, utilizing one or more direct digital frequency synthesizers, a plurality of signals to generate a plurality of modulated intermediate frequency (IF) signals corresponding to each of said plurality of different wireless communication protocols and to generate a plurality of amplitude signals corresponding to each of said plurality of different wireless communication protocols;
- frequency modulating said generated plurality of modulated IF signals utilizing said one or more direct digital frequency synthesizers;
- up-converting said generated plurality of modulated IF signals to a plurality of radio frequency (RF) signals; and
- combining said plurality of RF signals; and
- amplitude modulating said combined RF signals and said generated plurality of amplitude signals.

30. The non-transitory machine-readable storage according to claim 29, wherein said plurality of different wireless communication protocols comprises of: a Bluetooth communication protocol, a wireless local area network (WLAN) communication protocol and/or a ZigBee communication protocol.

31. The non-transitory machine-readable storage according to claim 29, wherein said at least one code section comprises code for phase modulating said generated plurality of modulated IF signals utilizing said one or more direct digital frequency synthesizers.

32. The non-transitory machine-readable storage according to claim 29, wherein said at least one code section comprises code for selecting a particular frequency channel corresponding to each of said plurality of wireless communication protocols.

33. The non-transitory machine-readable storage according to claim 29, wherein said at least one code section comprises code for amplitude modulating said generated plurality of modulated IF signals.

* * * * *